United States Patent [19]

Khmelnitsky et al.

[11] Patent Number: 5,847,776
[45] Date of Patent: Dec. 8, 1998

[54] METHOD FOR ENTROPY CONSTRAINED MOTION ESTIMATION AND CODING OF MOTION VECTORS WITH INCREASED SEARCH RANGE

[75] Inventors: Alex Khmelnitsky, Hod Hasharon; Eugene Taits, Kfar Saba, both of Israel

[73] Assignee: VDOnet Corporation Ltd., Ra'anana, Israel

[21] Appl. No.: 668,951

[22] Filed: Jun. 24, 1996

[51] Int. Cl.$^6$ ..................................................... H04N 7/36
[52] U.S. Cl. ........................... 348/699; 341/67; 341/106; 358/261.1; 382/236; 382/245; 382/246
[58] Field of Search .................................. 348/402, 407, 348/413, 416, 699; 358/261.1, 261.4; 341/67, 106; 382/236, 245, 246; H04N 7/36

[56] References Cited

U.S. PATENT DOCUMENTS

| 5,317,397 | 5/1994 | Odaka | 348/416 |
| 5,424,779 | 6/1995 | Odaka | 348/416 |

*Primary Examiner*—Howard Britton
*Attorney, Agent, or Firm*—Skjerven, Morrill, MacPherson, Franklin & Friel LLP

[57] ABSTRACT

A novel method of improving the motion estimation and coding efficiency of Interframes in a video compression system is disclosed. The method teaches a novel minimization function to be used to determine the optimum motion vector for a block within a picture. The minization function takes into account not just the conventional sum of the differences but also the quantization step, the motion vector itself and the predicted motion vector. The minimization function disclosed better balances the tradeoff between the size of the motion vectors and the size of the resulting residuals. The results are particularly useful when the range of the search is increased. Motion vectors closer to the prediction motion vector will be favored over better matches found further away from the prediction motion vector. In addition, a novel variable length coding (VLC) method is also disclosed. The disclosed encoding method is able to code numbers having a range double that of conventional VLC tables but with a very small penalty in increased bit length.

7 Claims, 4 Drawing Sheets

```
FOR EACH BLOCK
   FOR ALL POSSIBLE (Vx,Vy) WITHIN THE SEARCH RANGE
      FIND (Vx,Vy) THAT MINIMIZES:
```

$$\sum_{\substack{i=i_0 \\ j=j_0}}^{i_1, j_1} \left| C_{ij} - P_{i+V_X, j+V_Y} \right| + QP*(|V_x - PV_x| + |V_y - PV_y|)$$

```
   END FOR
END FOR
```

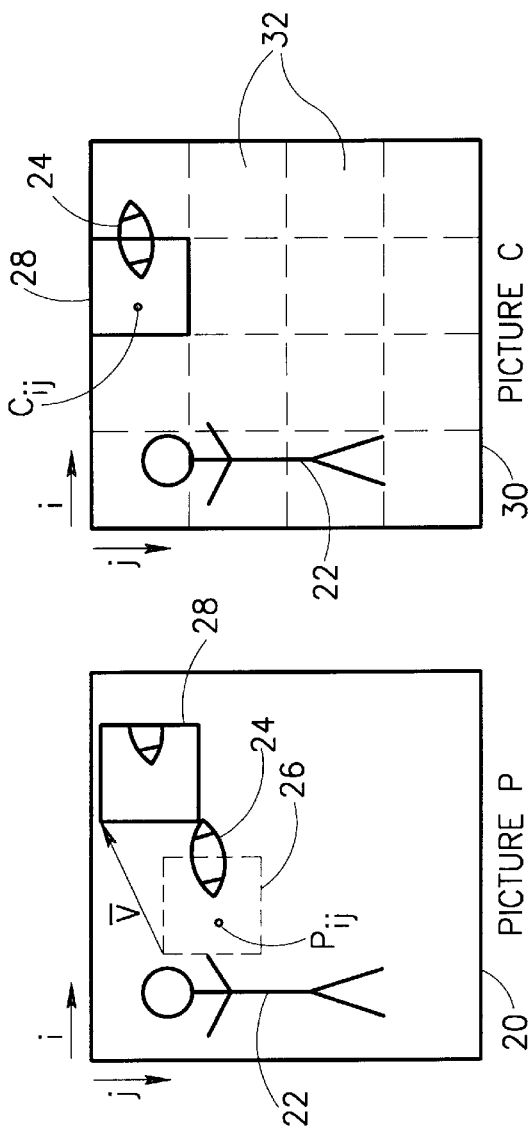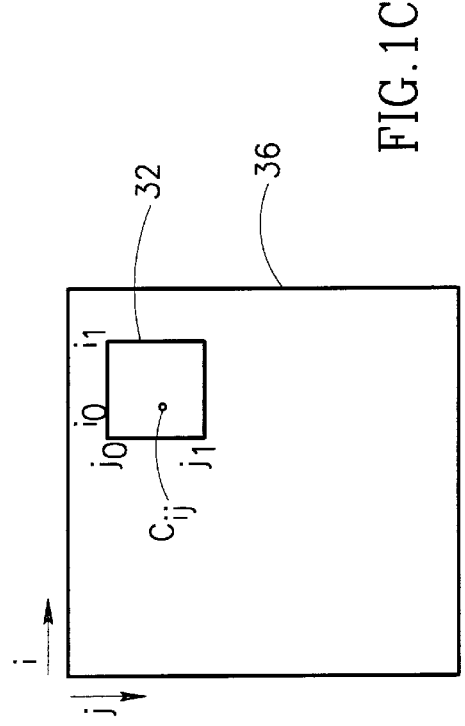

FOR EACH BLOCK
    FOR ALL POSSIBLE $(V_X, V_Y)$ WITHIN THE SEARCH RANGE
        FIND $(V_X, V_Y)$ THAT MINIMIZES:

$$\sum_{\substack{i=i_0 \\ j=j_0}}^{i_1, j_1} \left| C_{ij} - P_{i+V_X, j+V_Y} \right|$$

END FOR
END FOR

FIG.2
PRIOR ART

FOR EACH BLOCK
    FOR ALL POSSIBLE $(V_X, V_Y)$ WITHIN THE SEARCH RANGE
        FIND $(V_X, V_Y)$ THAT MINIMIZES:

$$\sum_{\substack{i=i_0 \\ j=j_0}}^{i_1, j_1} \left| C_{ij} - P_{i+V_X, j+V_Y} \right| + QP*(|V_x - PV_x| + |V_y - PV_y|)$$

END FOR
END FOR

FIG.3

METHOD FOR ENTROPY CONSTRAINED MOTION ESTIMATION AND CODING OF MOTION VECTORS WITH INCREASED SEARCH RANGE

FIELD OF THE INVENTION

The present invention relates generally to the coding and transmission of moving pictures and more particularly relates to motion estimation and the coding of motion vectors.

BACKGROUND OF THE INVENTION

With the advent of widespread multimedia distribution, including video, over intra and internetworks and other communication channels or networks, a number of standards for compressing video signals have been adopted that function to the greatly reduce the bandwidth of the transmitted video signal over the communication medium. For example, the MPEG international standard was developed in response to the need for an efficient was of storing and transmitting video information in digital form. Other related standards include ITU H.261, H.263 and ISO 10918.

The MPEG international video standard defines a format for compressed digital video. Video is represented as a succession of individual pictures, wherein each picture is treated as a two-dimensional array of picture elements, called pixels. Each picture corresponds to a single frame of motion video. The standard defines four types of pictures: I-pictures or intracoded pictures, coded without reference to any other pictures; P-pictures or predictive coded pictures, coded using motion estimation from a previous I or P-picture; B-pictures or bidirectionally predictive coded pictures, coded using motion estimation from a previous and a future I or P-picture; and D-pictures which are intended for a fast forward search mode. Typical coding schemes comprises a mix of I, P and B-pictures.

These international video standards involve block based motion estimation techniques to reduce the temporal redundancy. As explained in more detail below, the encoding process involves predicting motion estimation vectors for each block within a successive picture. For every block within the current picture the best matching block of the previous picture is determined. Rather than send the entire picture, a set of motion vectors and residuals that represent the changes or deltas from one picture to the next is sent instead. In the prior art the search for the best match is based on a minimization which depends only on the differences between the pixel values of the current block and the pixel values of the best matching block found, also called the residual. This technique optimizes the compression of the residuals but does not take into account the coding of the motion vectors. In addition, a tradeoff exists when the search range is increased. Optimum motion vectors may be found at the outer extremes of the search range resulting in longer bit representations for the motion vectors. Thus, the quality of the encoded video is improved but at a cost of increased bits needed to represent the optimum motion vectors.

Another issue is the motion estimation search range for fast changes in a scene. When a scene in a motion picture changes very quickly, the best matching block will typically lie outside the search range of conventional motion estimation techniques. In prior art techniques any increase in the motion estimation search range, for better estimating quick changes in scene, results in a direct reduction in the coding efficiency of the resulting motion vectors.

SUMMARY OF THE INVENTION

Accordingly, it is an object of the present invention to provide a method of improving coding efficiency by increasing the motion estimation range and coding the resulting motion vectors using a code that does not penalize larger length motion vectors.

It is another object of the present invention to provide a method of improving the coding efficiency by optimizing the bit distribution between encoded motion vectors and residuals.

A method of improving the motion estimation and coding efficiency of Interframes in a video compression system is disclosed. The method teaches a minimization function to be used to determine the optimum motion vector for a block within a picture. The minimization functions takes into account not just the conventional sum of the differences but also the quantization step, the motion vector itself and the predicted motion vector. The minimization function better balances the tradeoff between the size of the motion vectors and the size of the resulting residuals. The results are particularly useful when the range of the search is increased. Motion vectors closer to the prediction motion vector will be favored over better matches found further away from the prediction motion vector. In addition, a variable length coding (VLC) and run length encoding method are also disclosed. The disclosed encoding method is able to code numbers having a range larger that of conventional VLC tables but with a very small penalty in increased bit length and the run length encoding method encodes series of consecutive zeros to further reduce bandwidth requirements.

There is provided in accordance with a preferred embodiment of the present invention a method of improving the motion estimation and coding efficiency of Interframes in a video compression system, the video compression system dividing a current picture into a plurality of smaller size blocks, each the block containing $(i_1-i_0)$ by $(j_1-j_0)$ pixels, the method comprising the steps of stepping through each the block in the current picture, for each the block, stepping through all motion vectors (MV) $V_X$, $V_Y$ within a predetermined search range, for each the motion vector, calculating the expression given by $$\sum_{i=i_0, j=i_0}^{i_1, j_1} |C_{ij} - P_i + v_{x,j} + V_r| + f(QP, MV, PMV)$$

wherein $C_{ij}$ represents a pixel within the search range in a previous picture which preceded the current picture in time, $P_{ij}$ represents a pixel within the block in the current picture, QP is the quantization step, PMV is a predicted motion vector, and determining an optimum motion vector $V_X$, $V_Y$ that minimizes the above the expression.

$$\sum_{i=i_0, j=j_0}^{i_1, j_1} |C_{ij} - P_i + v_{x,j} + v_Y| + QP*(|V_X - PV_X| + |V_Y - PV_Y|)$$

wherein $C_{ij}$ represents a pixel within the search range in a previous picture which preceded the current picture in time, $P_{ij}$ represents a pixel within the block in the current picture, QP is the quantization step, PMV is a predicted motion vector represented by $PV_X$, $PV_Y$.

There is also provided in accordance with a preferred embodiment of the present invention a method of improving the motion estimation and coding efficiency of Interframes in a video compression system, the video compression system dividing a current picture into a plurality of smaller size blocks, each the block containing $i_1-j_0$) by 6 $1-j_0$) pixels, the method comprising the steps of stepping through each the block in the current picture, for each the block, stepping through all motion vectors (MV) $V_X$, $V_Y$ within a predetermined search range, for each the motion vector, calculating the expression $$\sum_{i=i_0,j=j_0}^{i_1,j_1} |C_{ij} - P_i + v_{X,j} + v_Y| + QP^*(|V_X - PV_X| + |V_Y - PV_Y|)$$

wherein $C_{ij}$ represents a pixel within the search range in a previous picture which preceded the current picture in time, $P_{ij}$ represents a pixel within the block in the current picture, QP is the quantization step, PMV is a predicted motion vector represented by $PV_X$, $PV_Y$, and determining an optimum motion vector $V_X$, $V_Y$ that minimizes the above the expression.

In addition there is also provided in accordance with a preferred embodiment of the present invention a method of encoding a number, the method utilizing a suitable variable length coding technique, the method improving the motion estimation and coding efficiency of Interframes in a video compression system, the method comprising the steps of outputting a single bit if the number equals zero and then terminating the method, outputting a single bit representing the sign of the number, calculating a value $V_1$ equal to the absolute value of the number minus 1, if the $V_1$ is even, calculating a value $V_2$ equal to the $V_1$ divided by 2, if the $V_1$ is odd, calculating the $V_2$ as follows: $V_2=-1-(V_1-1)/2$, and encoding the $V_2$ utilizing the variable length coding technique.

Also provided in accordance with a preferred embodiment of the present invention is a method of ran length encoding a series of numbers, the method utilizing a run length coding technique and a suitable variable length coding technique, the method improving the motion estimation and coding efficiency of Interframes in a video compression system, the method comprising the steps of for the numbers valued zero: encoding zeros present in the series of numbers using the run length technique, for the numbers valued non-zero: outputting a single bit representing the sign of the number, calculating a value $V_1$ equal to the absolute value of the number minus 1, if the $V_1$ is even, calculatng a value $V_2$ equal to the $V_1$ divided by 2, if the $V_1$ is odd, calculating the $V_2$ as follows: $V_2=-1-(V_1-1)/2$, and encoding the $V_2$ utilizing the variable length coding technique.

BRIEF DESCRIPTION OF THE DRAWINGS

The invention is herein described, by way of example only, with reference to the accompanying drawings, wherein:

FIG. 1A is an illustration of an initial video picture screen P showing an example of an object that has moved between successive pictures;

FIG. 1B is an illustration of a subsequent video picture screen C divided into blocks and showing an example of an object that has changed positions from the previous picture screen P shown in FIG. 1A, FIG. 1C is an illustration of an example picture screen showing a sample block and the coordinate addressing of pixels therein;

FIG. 2 illustrates the prior art criteria used in the determination of motion vector data in perform motion estimation;

FIG. 3 illustrates the criteria of the present invention used in the determination of motion vector data in performing motion estimation;

DETAILED DESCRIPTION OF THE INVENTION

Video Compression and Motion Estimation

Figure 4:
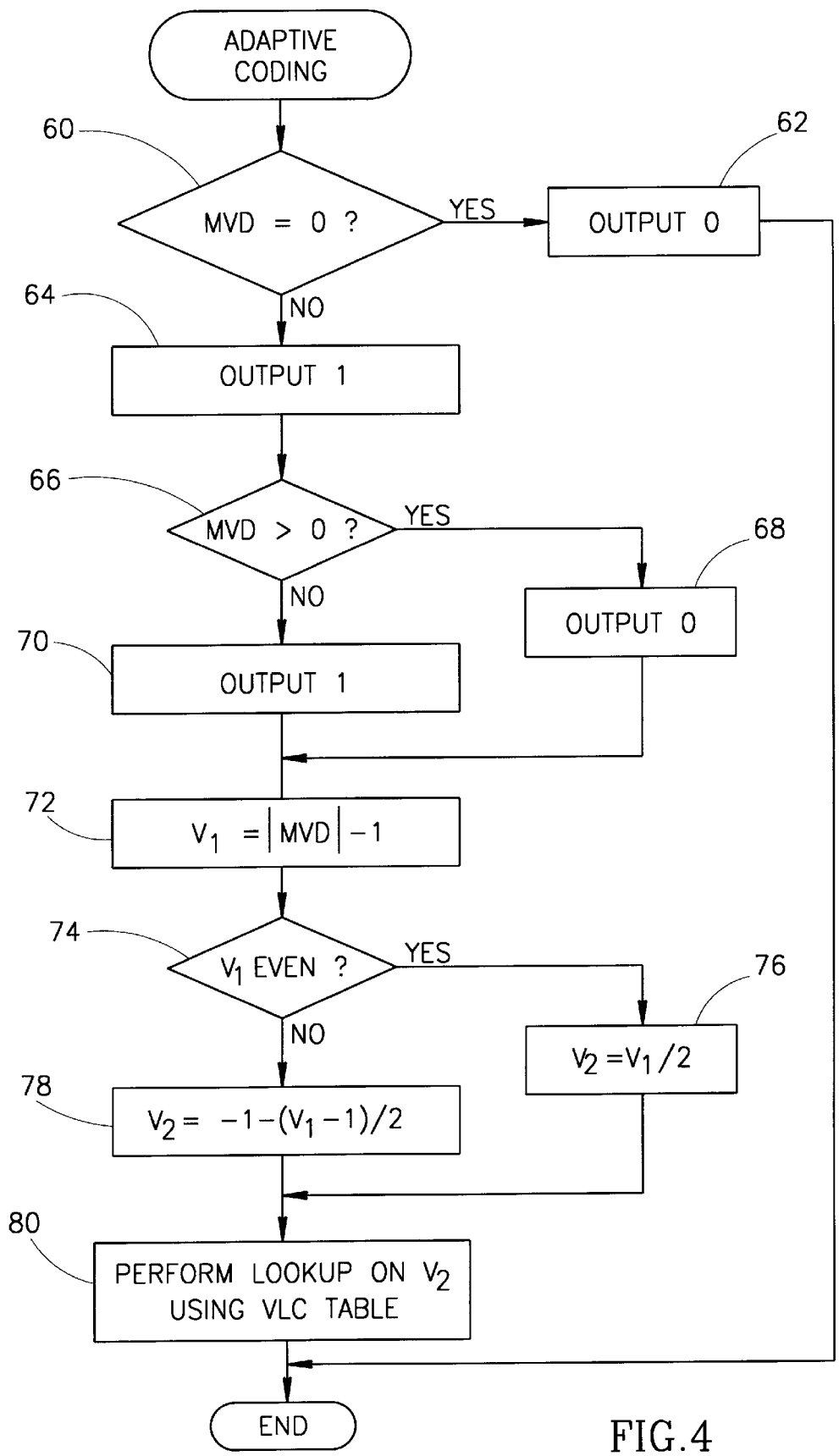
FIG. 4 is a high level flow diagram illustrating the method of the present invention for adaptively encoding differential motion vectors.

To aid in the understanding of the pimples of the present invention an illustration of two picture screens are shown in FIGS. 1A and 1B. FIG. 1A illustrates an initial video picture screen P showing an example of an object that has moved between successive pictures and FIG. 1B illustrates a subsequent video picture screen C divided into blocks and showing an example of an object that has changed positions from the previous picture screen P shown in FIG. 1A. In picture P 20, a person 22 is shown throwing a ball 24. In the next picture C 30, the person is seen in the same position but the ball has moved across the picture screen.

The video stream is represented as a succession of individual pictures. Each picture is considered a 2-dimensional array of pixels. The video coding process, e.g., MPEG-2, serves to compress the video stream to a much slower bit rate. The video is compressed by removing redundant and noncrucial information in the video bitstream. Compression of digitized video comes from the use of more than one technique. Techniques include subsampling of the chrominance information to match the sensitivity of the human visual system (HVS), quantization, motion compensation or estimation to exploit temporal redundancy, frequency transformation by discrete cosine transform (DCT) to exploit spatial redundancy, variable length coding (VLC) and picture interpolation. The present invention has applications in motion estimation and variable length coding both of which are explained in more detail below.

The overriding principle goal of these various compression techniques are to reduce the bandwidth of the video signal. Motion estimation predicts the value of a block of neighboring pixels in a picture by generating a 2-dimensional motion vector based on previous pictures. This helps reduce bandwidth by transmitting only the differences between successive pictures. For example, if there is no motion in a picture from one scene to the next, the motion vectors for all the blocks are equal to zero. In applications such as video conferencing, picture content changes relatively little between successive pictures. Only transmitting the changes between pictures can greatly reduce the bandwidth of the transmitted video. This technique is based on the fact that within a short sequence of pictures, a majority of the image remain stationary with only small portions moving slightly.

Variable length encoding is another technique that can also greatly reduce the amount of transmitted video information, having applications in many fields not just in compressing video. It is a statistical coding technique that assigns codewords to values to be encoded. If the distribution of the range of numbers that need to be encoded is not equal but is skewed than it is more efficient to assign different length codes to each number. For example, if numbers close to zero occur much more often than higher magnitude numbers, it is more efficient to assign shorter length codes to the numbers close to zero and longer length codes to numbers of larger magnitude.

With reference to FIGS. 1A, 1B and 1C, the process of determining the motion vectors for a picture involves dividing the picture screen 30 into a plurality of blocks 32. A sample block 28 is shown having a piece of the ball within it. Within each picture coordinates along the x-axis are defined by the index i which increase toward the right direction. Coordinates along the y-axis are defined by the index j and increase in the downward direction. A sample block 32 is shown in FIG. 1C. Each block has a certain width and length. Typically, the dimension of blocks 32 are 16×16 or 8×8 but may be other dimensions as well. Sample block 32 is shown with pixels in the x-direction labeled $i_0$ to $i_1$ and in the y-direction labeled $j_0$ to $j_1$. Each individual pixel in the block is labeled $C_{ij}$.

The process of motion estimation involves searching for the best match between the image in block 28 and the pixels in picture P 20. If a close match can be found than only the difference between the two pictures needs to be transmitted. The difference is represented by the motion vector (MV) labeled V bar in FIG. 1A and having an X and Y component. The search for a good block match is only performed in a limited area because there is a high probability that most objects do not move very much from picture to picture. Thus, it would be wasteful most of the time to search the entire picture area. Increasing the search range would increase the match rate but with the price of increased processing required. Despite the increased processing, doubling the search range improves the quality of the decoded video.

Minimization Criteria of the Prior Art

The process of finding the best match for each block involves searching within the search range using a selected criteria. Illustrated in FIG. 2 is the prior art criteria used in the determination of motion vector data in performing motion estimation. The criteria is given by $$\sum_{i=i_0, j=j_0}^{i_1, j_1} |C_{ij} - P_i + v_{X,j} + v_Y|$$

For each block within the picture and for each $V_X$, $V_Y$ within the search range the above sum of the differences (SAD) function is computed. The block size is defined as ($i_1-i_0$) by ($j_1-j_0$) pixels. The $V_X$, $V_Y$ that give a minimum SAD is designated the motion vector (MV) for that block.

However, using an increased range (e.g., +/−15 extended to +/−30) for the motion vector may lead to an increase in the number of bits needed to represent the motion vector, Since, with an increased range, the best match may be found further out in the search range. This is in spite of the fact that an increased search range may reduce the number of bits used for residual data. The disadvantage of this prior art technique is that it does not take into account the tradeoff between the encoded motion vector bits and the residual bits. This tradeoff becomes even more important when the search range is increased. The search criteria of the prior art does not compensate for this fact. Thus, the present invention teaches an improved search criteria that compensates for this fact and maintains a proper balance between the magnitude of the motion vector on the one hand and the magnitude of the residuals on the other hand.

Minimization Criteria of the Present Invention

Rather than minimize the SAD by itself, a method of the present invention utilizes a minimization function that depends not only on the SAD but on the quantization step (QP) and the distance from the predicted motion vector (PMV). The minimization function can generally be expressed as SAD+f(QP, MV, PMV)

The minimization function is a function of the SAD and a function of the quantization step, the motion vector and the predicted motion vector. In a preferred embodiment of the present invention the above minimization function is given by

SAD+QP * |MV−PMV| which can firer be expressed as $$\sum_{i=i_0, j=j_0}^{i_1, j_1} |C_{ij} - P_i + v_{X,j} + v_Y| + QP*(|V_X - PV_X| + |V_Y - PV_Y|)$$

This minimization criteria is shown in FIG. 3. The SAD component is the same as in the prior art criteria shown in FIG. 2. For each block and for each possible motion vector MV, coordinate pair $V_X$, $V_Y$ within the search range the criteria is calculated. The predicted motion vector, represented by $PV_X$, $PV_Y$ is subtracted from the motion vector $V_X$, $V_Y$. Using the criteria of the present invention, for the same residual, vectors closer to the prediction motion vector are favored which serves to minimize the number of bits needed to encode the residual and the motion vector.

Preferably, the PMV is obtained from taking the median x value and median y value of three previously received blocks that are adjacent to the current block which we are seeking a match for. Other methods known in art for obtain the PMV value can also be used. For a particular block, the PMV value is constant. The absolute value of the difference between the current motion vector MV and the median PMV is multiplied by QP and added to the SAD. Thus, rather than have the minimization function depend on the SAD alone, the minimization function depends on the SAD, the quantization step QP and the distance from the motion vector predictor PMV value. The SAD divided by the quantization step, SAD/QP, can be used as an estimate of the number of bits needed to encode the residual value.

Adaptive Differential Encoding of Motion Vectors

As stated previously, in prior art motion estimation techniques increasing the search range leads to additional encoding bits even for small motion vector deltas (i.e., MV−PMV). The present invention comprises a method of adaptively encoding the differential motion vectors (MVD), MV−PMV, which is used to reduce the bandwidth needed to transmit the increased range of motion vectors.

In contrast, the advantage of the method of the present invention is that additional encoding bits for numbers close to zero are not imposed, resulting in lower bandwidth requirements. A high level flow diagram illustrating the method of the present invention for adaptively encoding differential motion vectors used in conjunction with an increase in the search range of motion estimation is shown in FIG. 4. First a check is made whether MVD is equal 0(step 60). If so, a 0 bit is output (step 62) and the process terminates. Otherwise, a 1 bit is output (step 64). Next, it is checked whether the MVD is greater than zero (step 66). If so, a 0 bit is output (step 68), otherwise a 1 bit is output (step 70). The value $V_1$ is then calculated by subtracting 1 from the absolute value of MVD (step 72). If $V_1$ is even (step 74) then the value $V_2$ is computed by halving $V_1$ (step 76). If $V_1$ is odd, $V_2$ is calculated using $V_2 = -1-(V_1-1)/2$ (step 78)

Once the value $V_2$ is calculated a lookup on $V_2$ is performed using a suitable VLC table, such as the VLC table presented in ITU specification H.263 (step 80).

A table showing a comparison of the number of bits needed to encode the MVD for MVDs in the range 0 through 16 for various encoding schemes is presented below.

| | Number of Bits | |
|---|---|---|
| MVD | Coding Method of the Present Invention | ITU Specification H.263 |
| 0 | 1 | 1 |
| 1 | 3 | 3 |
| 2 | 5 | 4 |
| 3 | 5 | 5 |
| 4 | 6 | 7 |
| 5 | 6 | 8 |
| 6 | 7 | 8 |
| 7 | 7 | 8 |
| 8 | 9 | 10 |
| 9 | 9 | 10 |
| 10 | 10 | 10 |

As shown in the table above, the encoding scheme of the present invention doubles the range of MVD values without imposing any additional bits for MVD values of 0 and 1 compared to the H.263 encoding scheme.

Run Length Encoding of Motion Vectors

The present invention also discloses a method of run length encoding the motion vectors to further decrease the required bandwidth. Rather than encoding every zero value motion vector with some number of bits, the motion vectors that are equal to zero are encoded using a run length technique. Thus, the number of consecutive zeros is encoded using a suitable variable length code (VLC) table. For every non-zero number, the adaptive differential encoding method described in FIG. 4 is used but without writing the first bit because it is already known which numbers are zero and which are not.

Figure 5:
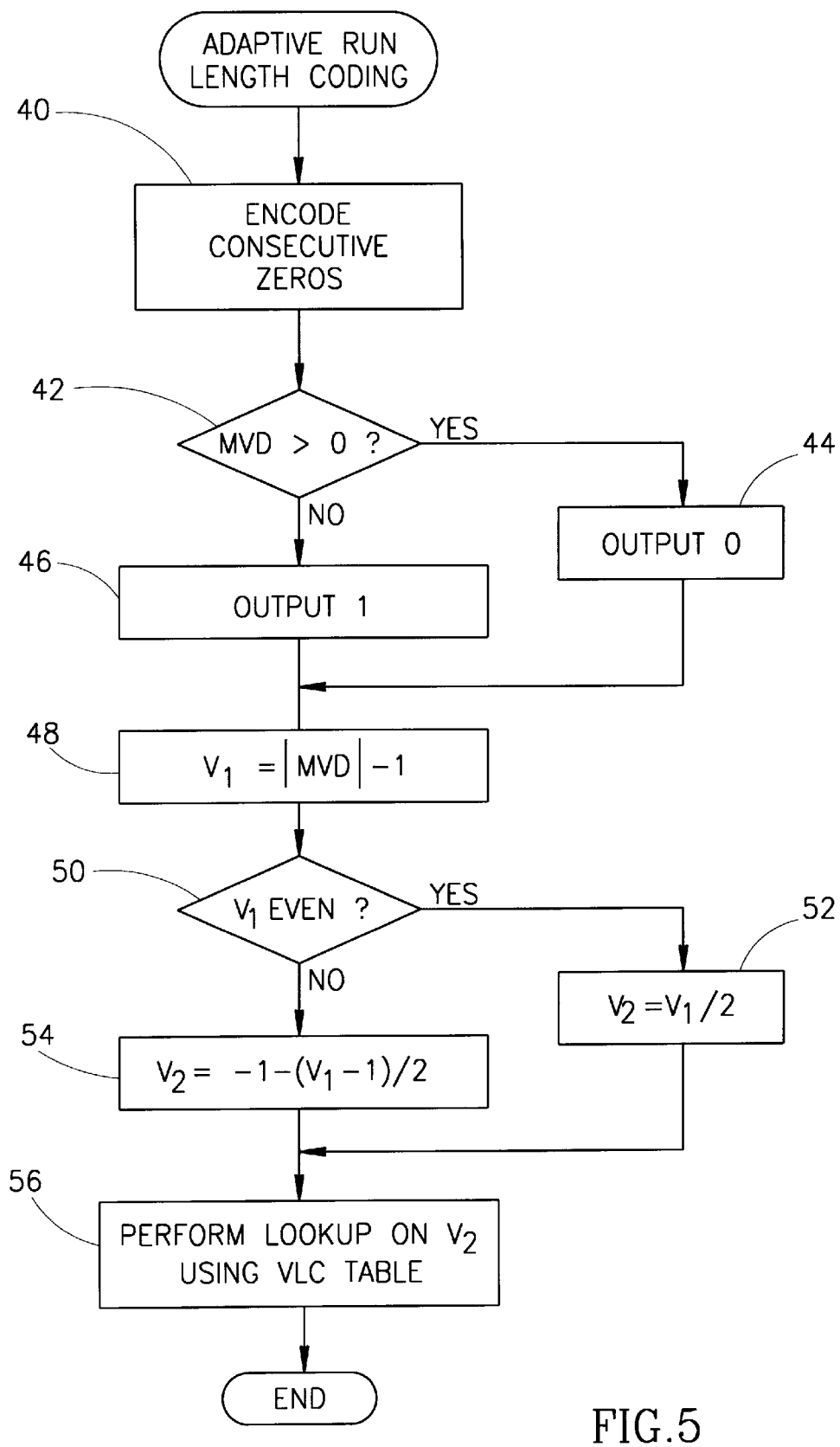
FIG. 5 is a high level flow diagram illustrating the method of the present invention for run length encoding motion vectors.

A high level flow diagram illustrating the method of the present invention for run length encoding motion vectors is shown in FIG. 5. First, series of consecutive zeros are encoded (step 40). Next, the method continues similarly to the method described in FIG. 4. It is then checked whether the MVD is greater than zero (step 42). If so, a 0 bit is output (step 44), otherwise a 1 bit is output (step 46). The value $V_1$ is then calculated by subtracting 1 from the absolute value of MVD (step 4 8). If $V_1$ is even (step 50) then the value $V_2$ is computed by halving $V_1$ (step 52). If $V_1$ is odd, $V_2$ is calculated using $$V_2 = -1 - (V_1 - 1)/2 \text{ (step 54)}$$

Once the value $V_2$ is calculated a lookup on $V_2$ is performed using a suitable VLC table, such as the VLC table presented in ITU specification H.263 (step 56).

While the invention has been described with respect to a limited number of embodiments, it will be appreciated that many variations, modifications and other applications of the invention may be made.

What is claimed is:

1. A method of improving the motion estimation and coding efficiency of Interframes in a video compression system, said video compression system dividing a current picture into a plurality of smaller size blocks, each said block containing $(i_1 - i_0)$ by $(j_1 - j_0)$ pixels, said method comprising the steps of:

stepping through each said block in said current picture;

for each said block, stepping through all motion vectors (MV) $V_X$, $V_Y$ within a predetermined search range;

for each said motion vector, calculating the expression given by $$\sum_{i=i_0, j=i_0}^{i_1, j_1} |C_{ij} - P_i + v_X, j + V_Y| + f(QP, MV, PMV)$$

wherein $C_{ij}$ represents a pixel within said search range in a previous picture which preceded said current picture in time, $P_{ij}$ represents a pixel within said block in said current picture, QP is the quantization step, PMV is a predicted motion vector; and determining an optimum motion vector $V_X$, $V_Y$ that minimizes the above said expression.

2. The method according to claim 1, wherein said expression is given by the following $$\sum_{i=i_0, j=j_0}^{i_1, j_1} |C_{ij} - P_i + v_X, j + v_Y| + QP^*(|V_X - PV_X| + |V_Y - PV_Y|)$$

wherein $C_{ij}$ represents a pixel within said search range in a previous picture which preceded said current picture in time, $P_{ij}$ represents a pixel within said block in said current picture, QP is the quantization step, PMV is a predicted motion vector represented by $PV_X$, $PV_Y$.

3. A method of improving the motion estimation and coding efficiency of Interframes in a video compression system, said video compression system dividing a current picture into a plurality of smaller size blocks, each said block containing $(i_1 - i_0)$ by $(j_1 - j_0)$ pixels, said method comprising the steps of:

stepping through each said block in said current picture;

for each said block, stepping through all motion vectors (MV) $V_X$, $V_Y$ within a predetermined search range;

for each said motion vector, calculating the expression $$\sum_{i=i_0, j=j_0}^{i_1, j_1} |C_{ij} - P_i + v_X, j + v_Y| + QP^*(|V_X - PV_X| + |V_Y - PV_Y|)$$

wherein $C_{ij}$ represents a pixel within said search range in a previous picture which preceded said current picture in time, $P_{ij}$ represents a pixel wit said block in said current picture, QP is the quantization step, PMV is a predicted motion vector represented by $PV_X$, $PV_Y$; and determining an optimum motion vector $V_X$, $V_Y$ that minimizes the above said expression.

4. A method of encoding a number, said method utilizing a suitable variable length coding technique, said method improving the motion estimation and coding efficiency of Interframes in a video compression system, said method comprising the steps of:

outputting a single bit if said number equals zero and then terminating said method;

outputting a single bit representing the sign of said number;

calculating a value $V_1$ equal to the absolute value of said number minus 1;

if said $V_1$ is even, calculating a value $V_2$ equal to said $V_1$ divided by 2;

if said $V_1$ is odd, calculating said $V_2$ as follows $$V_2 = -1 - (V_1 - 1)/2; \text{ and}$$

encoding said $V_2$ utilizing said variable length coding technique.

5. A method of run length encoding a series of numbers, said method utilizing a run length coding technique and a suitable variable length coding technique, said method improving the motion estimation and coding efficiency of Interfames in a video compression system, said method comprising the steps of:

for said numbers valued zero:
  encoding zeros present in said series of numbers using said run length technique;

for said numbers valued non-zero:
  outputting a single bit representing the sign of said number;
  calculating a value $V_1$ equal to the absolute value of said number minus 1;
  if said $V_1$ is even, calculating a value $V_2$ equal to said $V_1$ divided by 2;
  if said $V_1$ is odd, calculating said $V_2$ as follows $V_2 = -1 - (V_1 - 1)/2$; and encoding said $V_2$ utilizing said variable length coding technique.

6. A method of improving the motion estimation and coding efficiency of Interfames in a video compression system, said video compression system dividing a current picture into a plurality of smaller size blocks, each said block containing $(i_1 - j_0)$ by $(j_1 - j_0)$ pixels, said method utilizing a run length coding technique and a suitable variable length coding technique, said method comprising the steps of:

stepping through each said block in said current picture;
for each said block, stepping through all motion vectors (MV) $V_X$, $V_Y$ within a predetermined search range;
for each said motion vector, calculating the expression given by $$\sum_{i=i_0, j=i_0}^{h_1, j_1} |C_{ij} - P_i + v_x, j + Vr| + f(QP, MV, PMV)$$

wherein $C_{ij}$ represents a pixel within said search range in a previous picture which preceded said current picture in time, $P_{ij}$ represents a pixel within said block in said current picture, QP is the quantization step, PMV is a predicted motion vector;

determining an optimum motion vector $V_X$, $V_Y$ that minimizes the above said expression;

for said motion vectors valued zero:
  encoding zero valued motion vectors using said run length technique;

for said motion vectors valued non-zero:
  outputting a single bit representing the sign of said motion vector;
  calculating a value $V_1$ equal to the absolute value of said motion vector minus 1;
  if said $V_1$ is even, calculating a value $V_2$ equal to said $V_1$ divided by 2;
  if said $V_1$ is odd, calculating said $V_2$ as follows $V_2 = -1 - (V_1 - 1)/2$; and encoding said $V_2$ utilizing said variable length coding technique.

7. The method according to claim 6, wherein said expression is given by the following $$\sum_{i=i_0, j=j_0}^{i_1, j_1} |C_{ij} - P_i + v_{X,j} + v_Y| + QP^*(|V_X - PV_X| + |V_Y - PV_Y|)$$

wherein $C_{ij}$ represents a pixel within said search range in a previous picture which preceded said current picture in time, $P_{ij}$ represents a pixel within said block in said current picture, QP is the quantization step, PMV is a predicted motion vector represented by $PV_X$, $PV_Y$.

* * * * *